United States Patent [19]

Remlaoui

[11] Patent Number: 5,203,525
[45] Date of Patent: Apr. 20, 1993

[54] HINGE WITH OFFSET PIVOT LINE
[75] Inventor: Jihad I. Remlaoui, Oceanside, Calif.
[73] Assignee: Rohr, Inc., Chula Vista, Calif.
[21] Appl. No.: 780,957
[22] Filed: Oct. 23, 1991
[51] Int. Cl.⁵ .......................... B64C 1/14; E05D 15/00
[52] U.S. Cl. .................................... 244/129.4; 16/369
[58] Field of Search .................. 16/367, 368, 369; 244/129.4, 129.5

[56] References Cited

U.S. PATENT DOCUMENTS

| | | | |
|---|---|---|---|
| 1,710,396 | 4/1929 | Woodruff | 16/369 |
| 1,903,379 | 4/1933 | Hall | 16/367 |
| 4,524,485 | 6/1985 | Harris | 244/129.4 |
| 4,585,189 | 4/1986 | Buxton | 244/129.4 |

FOREIGN PATENT DOCUMENTS 517100  1/1940  United Kingdom ................ 16/368

*Primary Examiner*—Lowell A. Larson
*Assistant Examiner*—Carmine Cuda
*Attorney, Agent, or Firm*—P. J. Schlesinger; Frank Gilliam

[57] ABSTRACT

A hinge system for a curved surface that has several first hinges arranged along a straight hinge line and at least one second hinge offset from the hinge line. In a preferred embodiments, these hinges are fastened to a pylon and support a curved portion of an aircraft jet engine cowl, which may contain a thrust reverser assembly, to permit the cowl to pivot away from the engine for examination or repair of internal components. The hinges also accommodate engine thermal expansion which changes the distance between hinges along the cowl. The first hinges have their hinge points lying along the straight cowl hinge line. The second hinges include a plurality of short first links pivotally connected to the supporting pylon, and a plurality of short second links pivotally connected to the first links and the cowl. The link lengths are selected so that the assembly pivots about a hinge point outside the hinge structure that lies along the straight hinge line formed by the first hinges. The first links are adapted to change orientation to accommodate thermal expansion as the engine heats in operation. This hinge system permits designing the engine cowl with an optimum curved shape while permitting convenient hinged access to engine components.

16 Claims, 2 Drawing Sheets

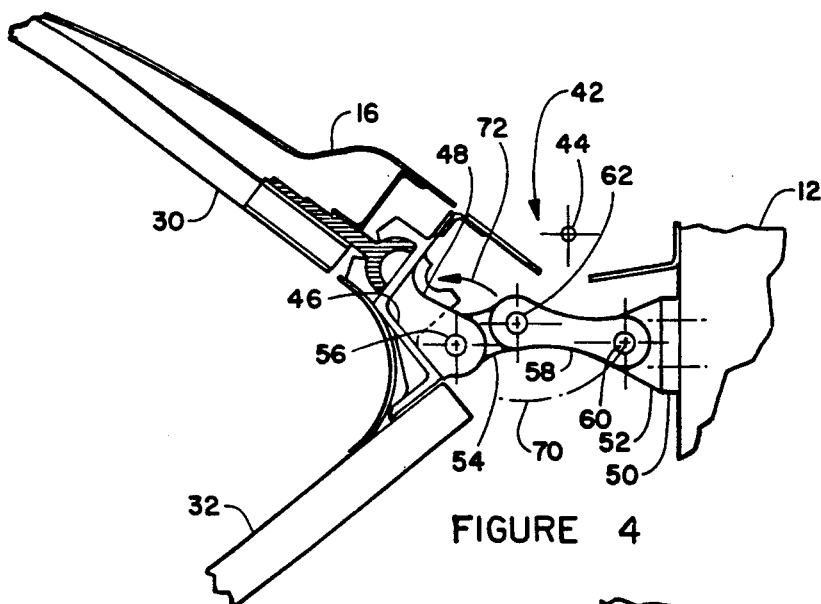
FIGURE 4
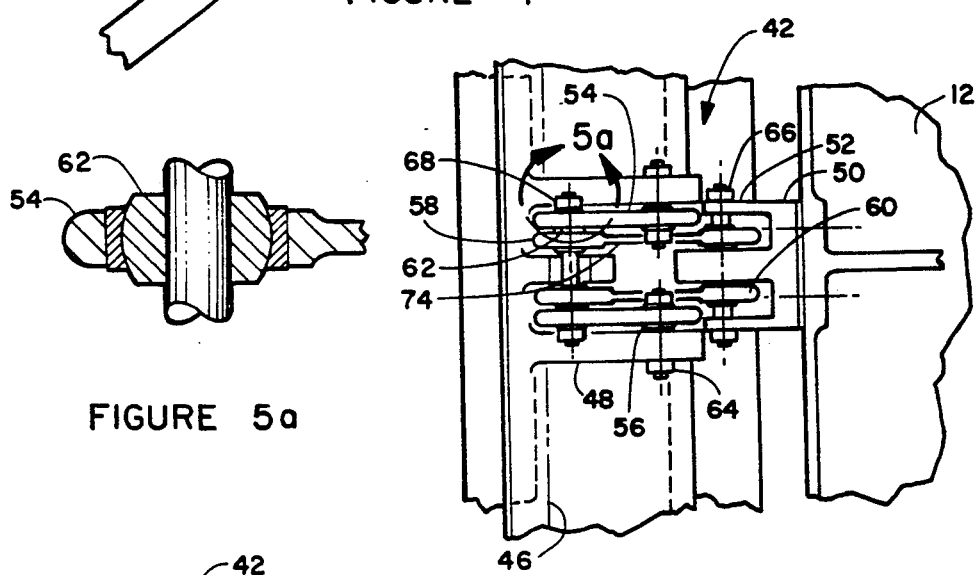
FIGURE 5a
FIGURE 5
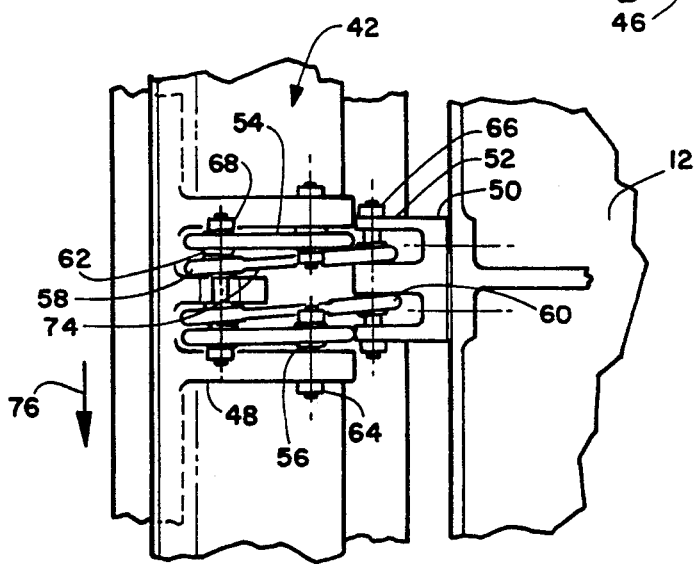
FIGURE 6

HINGE WITH OFFSET PIVOT LINE

BACKGROUND OF THE INVENTION

This invention relates in general to hinge systems and, more specifically, to hinge systems for pivoting curved structures about a straight hinge line in applications such as engine thrust reverser systems.

A wide variety of hinge systems have been developed for allowing one structure, such as a lid or door, to pivot relative to a box or cabinet. Two or more hinges are generally used with individual hinge lines lying along a straight line running through all of the individual hinge lines about which the moving part pivots. Some are surface mounted, others are hidden, but they have this single overall hinge line in common.

A number of different arrangements have been developed for mounting jet engines on aircraft using latches or pivoting means to assist in mounting and removal of the engine and to accommodate differential thermal expansion of the engine and supporting structure, often a pylon, during use. Typical of these are the systems described by Dolgy et al in U.S. Pat, No. 3,809,340 and Chee in U.S. Pat. No. 4,603,822. These all use mounting means arranged in a single position or along straight lines.

Various over-center hinges and tensioning devices using multiple links have been developed for special purposes, such as the band tensioning device of Aspinall as described in U.S. Pat. No. 4,557,44. No application of such links to the support of structures is shown.

A variety of removable access panels are often provided in order to permit examination and repair of internal components of large jet engines and the like. These panels are generally in the form of small panels held to the engine cowl by screws or other fasteners. In some cases, hinged panels are used, where a straight hinge line can be provided. No fully satisfactory arrangement exists for hingedly moving a large cowl panel, such as covers the thrust reverser, where the panel edge does not lie along a straight hinge line. With cascade type thrust reversers, it is desirable that the cowl be split at the bottom, opposite the pylon, and be hingedly mounted at the pylon to permit access to internal components, such as thrust reversers. The cowl of a modern jet engine tends to be continuously curved, making hinging of a such a pane difficult.

Thus, there is a continuing need for improved hinge systems that can accommodate a non-straight hinge line, can accommodate changes in the distance between hinges caused by differential thermal expansion and can support large and heavy structures, such as jet engine cowl sections.

SUMMARY OF THE INVENTION

It is, therefor, an object of this invention to provide a hinge system overcoming the above-noted problems. Another object is to provide a hinge system that will accommodate a curved structure where not all individual hinge lines can be arranged along a single straight hinge line. A further object is to provide a hinge system that will accommodate changes in distance between hinges caused by differential expansion between hinge support and hinged panel. Yet another object is to provide a hinge system capable of moving a curved jet engine panel between a first position forming part of the engine cowl and a second position allowing access to internal engine components, such as thrust reversers, within the panel.

The above-mentioned objects, and others, are accomplished by a hinge system for use where one structure, such as a jet engine cowl portion (which is curved in three dimensions), is to be pivoted relative to a second structure, such as an engine supporting pylon, even though the line of contact between the structures is not a straight line. This configuration makes use of a normal set of hinges arranged with their individual hinge lines arranged along a substantially straight line difficult, if not impossible.

The hinge system includes a first hinge assembly having at least two first hinges that are conventional hinges with brackets attached to each of the structures adjacent to the line of contact between them. Each bracket has at least one finger secured to the bracket, with the distal finger ends overlapping and having a hinge pin extending therethrough. All of the first hinges have their individual hinge lines lying along a substantially straight line. These hinges are positioned in a region where the line of structure contact is substantially straight, generally toward the center of the contact line.

At least one second hinge is used in regions where the contact line is significantly curved, typically near the ends of the contact line. The second hinge has brackets fastened to the structures adjacent to the contact line. Each bracket has at least one link pivotally fastened to the bracket. The distal ends of the brackets overlap and are pivotally secured together. The second hinges are physically located away from said straight line. The combination of brackets and links serves as a hinge having a hinge line outside the hinge assembly, the bracket position and link lengths being selected so that the hinge line lies along said straight line.

Thus, large, heavy, structures curved in three dimensions, such as portions of jet engine cowls, can be supported and pivoted from closed to open positions even though the contact lines are non-linear.

BRIEF DESCRIPTION OF THE DRAWING

Details of the invention, and of preferred embodiments thereof, will be further understood upon reference to the drawing, wherein:

FIG. 4 is a schematic section view taken on line 3—3 in FIG. 1 with the cowl open;

FIG. 5 is a schematic section view taken on line 5—5 in FIG. 1 with the engine cold; FIG. 5a is a schematic section view through the link bearing and FIG. 6 is a schematic section view taken on line 5—5 in FIG. 1 with the engine hot.

DETAILED DESCRIPTION OF PREFERRED EMBODIMENTS

Figure 1:
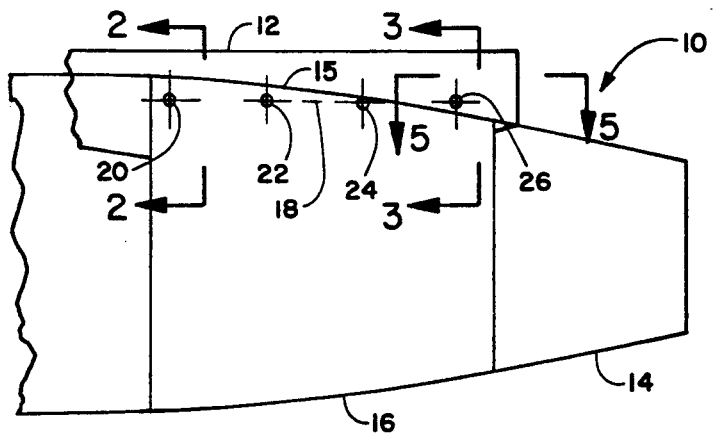
FIG. 1 is a schematic side view of an aircraft jet engine.

Referring now to FIG. 1, there is seen a schematic side view of a jet aircraft engine 10 mounted on a pylon 12 which may be secured to the aircraft wing (not shown). Cowl or nacelle 14 surrounds the internal engine components including a thrust reverser system. A cowl portion 16 is hingedly mounted to pylon 12 in a manner permitting the side of the cowl to be rotated away from engine 10 to permit access to internal components for examination or repair. Cowl portion 16 meets pylon 12 along a non-linear contact line 15. The cowl portion to be swung out may be half of the cowl circumference, as shown, or any selected smaller portion. Each side of the engine may have a similar arrangement. In the embodiment shown, cowl portion 16 may cover a stowed thrust reverser system, parts of which may be arranged to swing out with cowl portion 16.

Cowl portion 16 is pivoted on four hinge assemblies located just within the cowl and not seen in FIG. 1. Those assemblies are detailed in FIGS. 2-6. Cowl portion 16 is pivoted about a straight line schematically indicated at 18. The locations of the individual hinge lines are indicated at points 20, 22, 24 and 26. As can be seen, hinges 20, 22 and 24 have individual hinge lines located on line 18 within cowl portion 16. Those hinges may be conventional hinges having hinge pins lying along lines 18. However, the pivot point or individual hinge line for hinge 26 lies outside of cowl portion 16. A conventional hinge within cowl portion 16 could not function with this required individual hinge line. Placing a hinge outside cowl portion 16 to aooommodate the required hinge line would be difficult, cumbersome, and would greatly increase drag along the external engine surface during flight. Thus, a novel hinge arrangement is required, in combination with hinges 20, 22, and 24, to accommodate the nonlinear line of contact between pylon 12 and engine 10.

Figure 2:
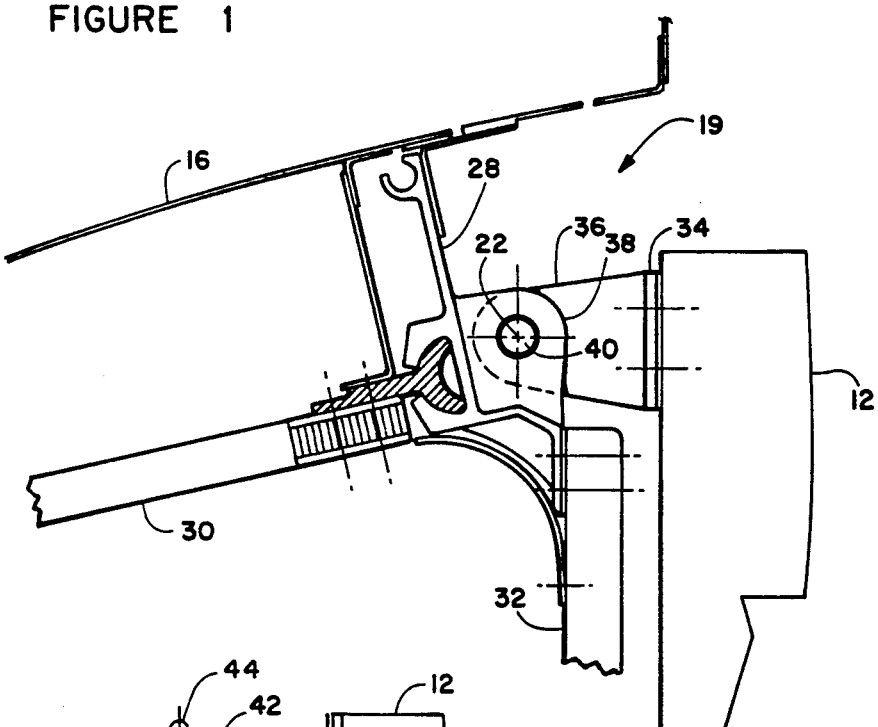
FIG. 2 is a schematic section view taken on line 2—2 in FIG. 1 with the cowl closed.
Figure 3:
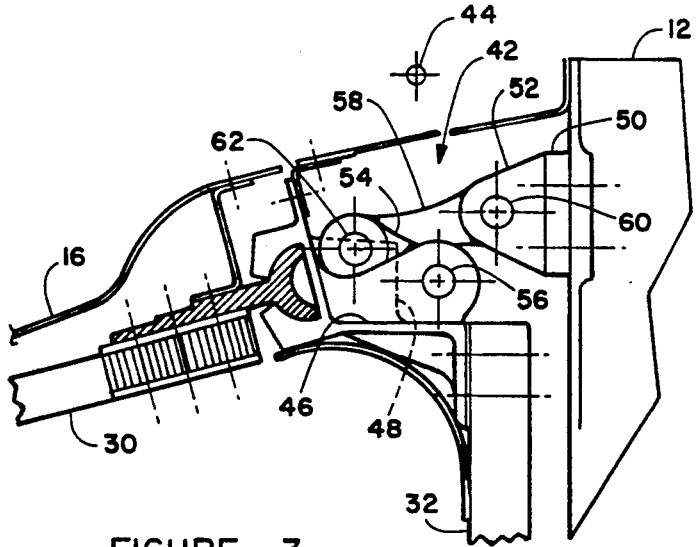
FIG. 3 is a schematic section view taken on line 3—3 in FIG. 1 with the cowl closed.

FIG. 2 illustrates in section view taken on line 2—2 in FIG. 1, a preferred hinge arrangement for use as the first hinges 19 that pivot at points 20, 22 and 24. A bracket 28 connects between, and is secured to, cowl portion 16, an internal structural member 30 and a thrust reverser component 32. A bracket 34 secured to pylon 12 has one or more upstanding fingers 36. Bracket 34 has one or more fingers 38 that extend adjacent to (or interleave with, in the case of multiple fingers 36 and 38) fingers 36. A pivot pin 40 extends through holes in the distal ends of fingers 36 and 38. The axis of pin 40 lies along straight line 18 in FIG. 1. Thus, first hinges 19 permit cowl portion 16 to pivot between a closed and an open position. However, if only these first hinges were used, the aft end of cowl portion 16 would be unsupported and unguided during movement.

In order to support the non-linear region of cowl portion 16, a novel hinge arrangement as shown in FIGS. 3-6 is provided. A second hinge assembly 42 mounts cowl portion 16 on pylon 12 for rotation about a hinge line 44 lying outside the hinge and outside cowl portion 16. A bracket 46 secures cowl portion 16, internal structure 30 and thrust reverser components 32 together. Bracket 46 mounts a plurality of fingers 48. Bracket 50 mounts a plurality of fingers 52 that are preferably closely interleaved with fingers 48. A first set of links 54 is pivotally secured to fingers 48 by bearings 56 and bolts 64. A second set of links 58 are pivotally secured to fingers 52 by bearings 60 and bolts 66. The distal ends of adjacent links 54 and 58 are pivotally secured by bearings 62 through which bolts 68 extend.

Movement of second hinge 42 toward the position in which cowl portion 16 is open is illustrated in FIG. 4. The line of movement of bearing 56 is schematically indicated by arc 70 while arc 72 illustrates the path of movement of bearing 62. The effective hinge point lies at 44.

The position of hinge point 44 is selected to lie along straight hinge line 18 (FIG. 1) by selecting the relative lengths of links 54 and 58 and the locations of fingers 48 and 52 on brackets 46 and 50.

While a single second hinge 42 is shown in the embodiment illustrated, cooperating with three first hinges 19, depending upon the size, location and curvature of the cowl portion 16 being pivoted, additional second hinges 42 could be used. For sufficient support to the overall assembly, at least two first hinges 19 should be used.

Engine 10 expands longitudinally due to thermal expansion as engine 10 heats up from a cold, shut down, condition to a powered flight condition. The hinge system of this invention provides for accommodation of thermal expansion, as illustrated in FIGS. 5 and 6. The upper surface of cowl portion 16 is cut-away to reveal second hinge 42.

The "cold engine" condition is shown in FIG. 5. Links 58 each has a relatively thin center section 74. When the engine is cold, sections 74 and links 58 overall are relatively straight. When engine 10 heats up in operation, the engine lengthens by thermal expansion, tending to move the aft end of cowl portion 16 in the direction indicated by arrow 76. Links 58 can change their orientation from that shown in FIG. 5 to that shown in FIG. 6 to accommodate that thermal expansion. Bearings 60 and 62 are preferably spherical bearings to more easily permit the required angular reorientation. Thus, despite the length of the link assembly, thermal expansion can be accommodated without damage or binding of the second hinge assembly 42.

Other applications, variations and ramifications of this invention will occur to those skilled in the art upon reading this disclosure. Those are intended to be included within the scope of this invention, as defined in the appended claims.

I claim:

1. In a hinge system for pivoting a first structure relative to a second structure where the contact line between said structures is non-linear, said system having at least two first hinges each having brackets secured to said first and second structures, at least one finger extending from each of said brackets and a hinge pin extending through the distal ends of said fingers, said hinge pins arranged in a substantially straight line substantially parallel to a non-linear line of contact between said structures and at least one second hinge assembly offset from said straight line, the improvement wherein:
    said second hinge assembly each comprises first and second brackets mounted on said first and second structures, respectively, adjacent to said non-linear line of contact, at least one first link pivotally secured to said first bracket, at least one second link pivotally connected to the distal end of said first link and to said second bracket, the hinge line of said assembly lying outside said assembly and substantially along said straight line; and
    spherical bearings connecting said at least one second link to said second bracket and to said at least one first link for allowing thermal expansion of said second structure relative to said first structure along said hinge line.

2. The improvement according to claim 1 wherein each of said first hinges includes a plurality of said fingers extending from each of said brackets in an interleaved configuration.

3. The improvement according to claim 1 wherein said first and second links are pivotally connected to their respective brackets by bolts extending said fingers and through bearings emplaced in said links.

4. The improvement according to claim 3 wherien said second links connected to said second bracket are relatively thin, said links change orientation to accommodate relative thermal expansion between said first and second structures along said hinge line.

5. A hinge system for pivoting a first structure relative to a second structure and having a non-linear contact line between said structures which comprises:
   at least two first hinges each having brackets secured to said first and second structures, at least one finger extending from each of said brackets and a hinge pin extending through the distal ends of said fingers, said hinge pins arranged in a substantially straight line substantially parallel to a non-linear line of contact between said structures;
   at least one second hinge assembly having first and second brackets secured to said first and second structures, respectively, at least one first link pivotally secured to said first bracket, at least one second link pivotally connected to said first links and pivotally connected to said second bracket;
   said second hinge assembly spaced from said stright line but adapted to pivot about a hinge line in space that lies along said straight line;
   spherical bearings connecting said at least one second link to said second bracket and to said at least one first link for accommodating thermal expansion of said second structure relative to said first structure along said straight line.

6. The system according to claim 5 wherein each of said first hinges includes a plurality of said fingers extending from each of said brackets in an interleaved arrangement.

7. The system according to claim 5 wherein said first and second links are pivotally connected to their respective brackets by bolts extending said fingers and through bearings emplaced in said links.

8. The system according to claim 7 wherein said second links connected to said second bracket are relatively thin, whereby said links change orientation to accommodate relative thermal expansion between said first and second structures along said straight line.

9. In an aircraft engine cowl assembly mounted on an aircraft by a pylon and having a three-dimensionally curved panel forming a portion of said cowl;
   said cowl portion being pivotally secured to said pylon by a system including multiple spaced hinges for movement between a closed position contiguous with said cowl and an open position swung away from said cowl to permit access to engine components beneath said cowl portion, the line of contact between said cowl portion and said pylon in the closed position being non-linear; said multiple hinges including
   at least two first hinges each having a first bracket secured to said cowl portion adjacent to said pylon, a second bracket secured to said pylon adjacent to said cowl portion, at least one finger secured to and extending from each of said brackets, and a pin extending through said fingers about which said first hinges are adapted to pivot, the axes of said pins lying along a substantially straight line; the improvement comprising:
   at least one second hinge having first and second brackets secured, respectively, to said pylon and core portion adjacent to said contact line, at least one first and second link pivotally secured to a respective one of said brackets, the distal ends of said links pivotally secured together, said brackets and links positioned away from said straight line with the hinge line of said second hinges lying outside of said second hinges and along said straight line; and
   spherical bearings connecting said at least one second link to said second bracket and to said at least one first link for accommodating thermal expansion of said second structure relative to said first structure along said straight line.

10. The assembly according to claim 9 wherien each of said first hinges includes a plurality of said fingers extending from each of said brackets in an interleaved arrangement.

11. The assembly according to claim 9 wherein said first and second links are pivotally connected to their respective brackets by bolts extending said fingers and through bearings emplaced in said links.

12. The assembly according to claim 11 wherein said second links connected to said second bracket are relatively thin, whereby said links change orientation to accommodate relative thermal expansion between said first and second structures along said straight line.

13. A hinge assembly for use with an aircraft engine cowl assembly mounted on an aircraft by a pylon and having a three-dimensionally curved panel forming a portion of said cowl adjacent to said cowl;
   said cowl portion being pivotally secured to said pylon by a system including multiple spaced hinges for movement between a closed position contiguous with said cowl and an open position swung away from said cowl to permit access to engine components beneath said cowl portion, the line of contact between said cowl portion and said pylon in the closed position being non-linear;
   said multiple hinges including:
   at least two first hinges each having a first bracket secured to said cowl portion adjacent to said pylon, a second bracket secured to said pylon adjacent to said cowl portion, at least one finger rigidly secured to and extending from each of said brackets, and a pin extending through the distal ends of said fingers, said first hinges being adapted to pivot about said pins, the axes of said pin lying along a substantially straight line; and
   at least one second hinge having first and second brackets secured, respectively, to said pylon and core portion adjacent to said contact line, at least one first and second link pivotally secured to a respective one of said brackets, the distal ends of said links pivotally secured together, said brackets and links positioned away from said straight line with the inge line of said second hinges lying outside of said second hinges and along said straight line; and
   spherical bearings connecting said at least one second link to said second bracket and to said at least one first link for accommodating thermal expansion of said second structure relative to said first structure along said straight line.

14. The assembly according to claim 13 wherein each of said first hinges includes a plurality of said fingers extending from each of said brackets in an interleaved arrangement.

15. The assembly according to claim 13 wherein said first and second links are pivotally connected to their respective brackets by bolts extending said fingers and through bearings emplaced in said links.

16. The assembly according to claim 15 wherein said second links connected to said second bracket are relatively thin, whereby said links change orientation to accommodate relative thermal expansion between said first and second structures.

* * * * *